United States Patent [19]
Kremmling et al.

[11] Patent Number: 5,632,706
[45] Date of Patent: May 27, 1997

[54] MOTOR VEHICLE WITH ELECTRONIC CLUTCH MANAGEMENT SYSTEM

[75] Inventors: Burkard Kremmling, Renchen; Michael Salecker, Achern; Martin Zimmermann, Sasbach, all of Germany

[73] Assignee: LuK Getriebe-Systeme GmbH, Bühl, Germany

[21] Appl. No.: 610,674

[22] Filed: Mar. 4, 1996

Related U.S. Application Data

[63] Continuation of Ser. No. 285,546, Aug. 3, 1994, abandoned.

[30] Foreign Application Priority Data

Aug. 3, 1993 [DE] Germany .................. 43 26 053.5

[51] Int. Cl.⁶ .................. B60K 41/02; B60K 23/02; F02D 45/00
[52] U.S. Cl. .................. 477/74; 192/4 A
[58] Field of Search .................. 192/4 A; 477/74

[56] References Cited

U.S. PATENT DOCUMENTS

| | | | |
|---|---|---|---|
| 3,757,915 | 9/1973 | Momose | 192/4 A |
| 3,850,273 | 11/1974 | Murakami | 192/4 A |
| 3,941,223 | 3/1976 | Murakami | 192/4 A |
| 4,579,200 | 4/1986 | Murakami et al. | 192/4 A |
| 4,618,042 | 10/1986 | Yamamoto | 477/74 |
| 4,653,622 | 3/1987 | Miyake | 477/74 |
| 4,804,074 | 2/1989 | Kori | 477/74 |
| 5,097,724 | 3/1992 | Braun | 477/74 |
| 5,393,274 | 2/1995 | Smedley | 477/74 |

FOREIGN PATENT DOCUMENTS

| | | |
|---|---|---|
| 0127085 | 12/1984 | European Pat. Off. . |
| 0323070 | 7/1989 | European Pat. Off. . |
| 4011850A1 | 4/1990 | Germany . |
| 2158912 | 11/1985 | United Kingdom . |

*Primary Examiner*—Dirk Wright
*Attorney, Agent, or Firm*—Darby & Darby

[57] ABSTRACT

A motor vehicle has a clutch which is controlled by an electronic clutch management system. When the vehicle is in gear with the engine running and is stationary or almost stationary with no gas being given, the system causes the clutch to become engaged just enough to make the vehicle creep.

81 Claims, 7 Drawing Sheets

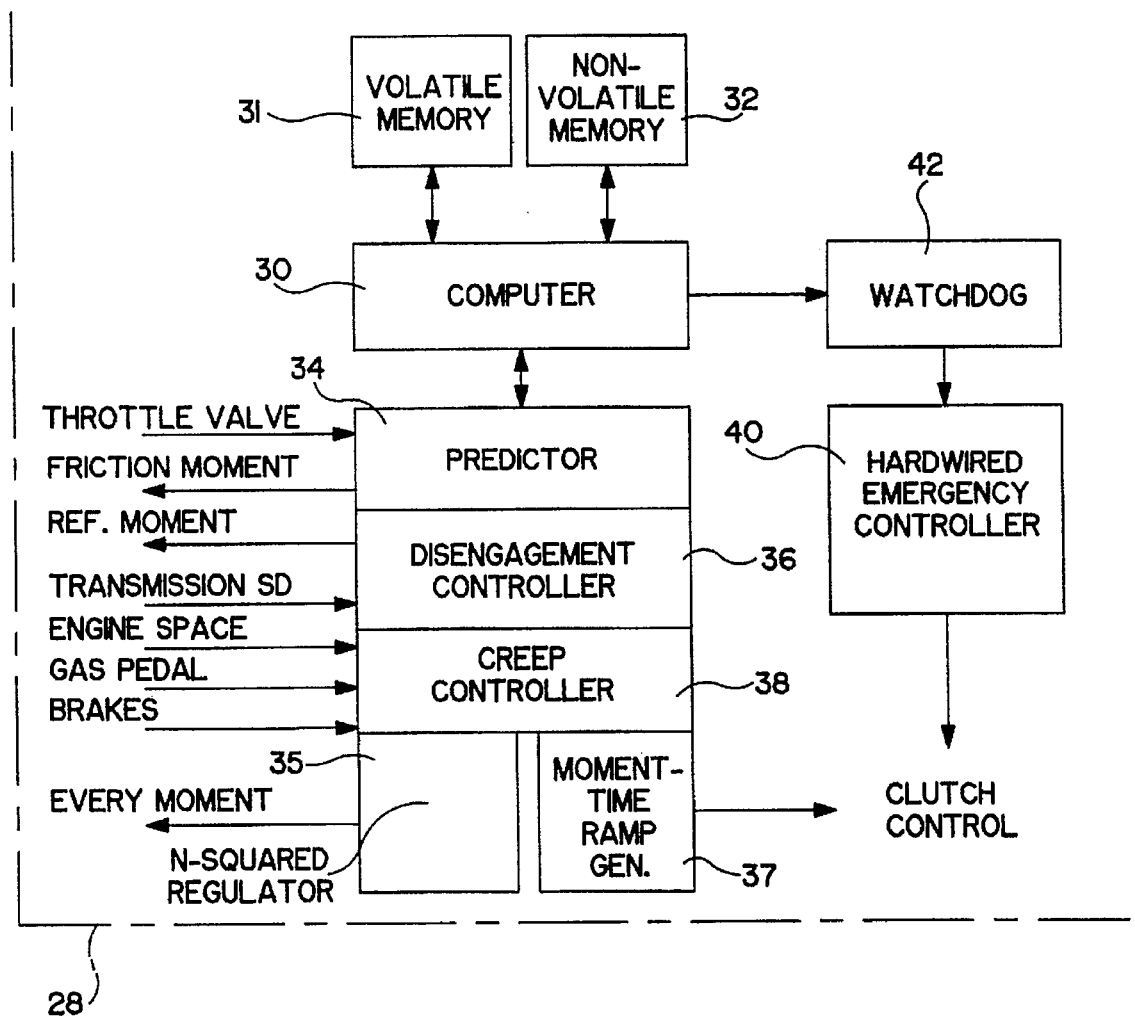
FIG. IA

MOTOR VEHICLE WITH ELECTRONIC CLUTCH MANAGEMENT SYSTEM

This is a continuation of application Ser. No. 08/285,546, filed Aug. 3, 1994, now abandoned.

FIELD OF THE INVENTION

The invention relates to a powered vehicle.

BACKGROUND OF THE INVENTION

German Offenlegungsschrift No. 40 11 850 discloses a motor vehicle which employs so-called "electronic clutch management" (ECM) system. The motor vehicle has a combustion engine, a multispeed manual transmission, an automatic clutch for coupling the engine to the transmission and a control unit for the clutch.

Under certain circumstances it is unsafe for the operator of such a motor vehicle to exit such a vehicle. For instance, if the vehicle is stationary and in gear with the engine idling, as may be the case when standing in front of a garage (the clutch is then in a standby position because the gas pedal is not depressed), a fault in the release system, e.g., a pressure drop in the hydraulic unit, could cause the clutch to close, that is, to engage the transmission. However, the driver is not warned to remain in the vehicle.

The sensitivity with which the moment exerted by the engine is transferred to the drive gears, e.g., while shifting, is also not entirely satisfactory. This has an adverse effect on the comfort of the vehicle. Moreover, it is difficult to set the vehicle in motion on icy roads. In addition, the vehicle is relatively expensive.

Furthermore, neither the sensitivity nor the speed of the control system is totally adequate and faults in the system are not readily detectable by the operator or by a repair shop. The electronic hardware is relatively complex and cannot be used universally. Additionally, the number of masters and slaves is rather large, and fairly extensive vehicle modifications are required in order to use the known version of the ECM system.

SUMMARY OF THE INVENTION

It is an object of the invention to improve the safety of an ECM-equipped vehicle.

Another object of the invention is to provide warning to an operator of an ECM-equipped vehicle when a particular combination of conditions makes it unsafe to exit the vehicle.

An additional object of the invention is to increase the comfort of an ECM-equipped vehicle.

A further object of the invention is to increase the sensitivity with which the moment generated by the engine of an ECM-equipped vehicle is transferred to the drive gears.

It is also an object of the invention to provide an ECM-equipped vehicle which can be set into motion relatively easily, even on icy roads.

Still another object of the invention is to provide an ECM system which can be manufactured relatively economically.

An additional object of the invention is to increase the sensitivity of an ECM system.

A further object of the invention is to increase the speed of an ECM system.

A concomitant object of the invention is to provide an ECM system capable of advising a vehicle operator or repair shop of faults in the system.

It is also an object of the invention to provide an ECM system which can store fault indications for subsequent recall.

Yet another object of the invention is to simplify the electronic hardware for an ECM system.

An additional object of the invention is to provide electronic hardware which is or can be used in an ECM system and has relatively widespread applicability.

A further object of the invention is to provide an ECM system which allows the number of masters and slaves to be reduced.

A concomitant object of the invention is to provide an ECM system which requires relatively few vehicle modifications.

It is an additional object of the invention to provide a method which enables a vehicle to be operated with increased safety.

The preceding objects, as well as others which will become apparent as the description proceeds, are achieved by the invention.

One aspect of the invention resides in a powered vehicle comprising an engine, e.g., an internal combustion engine, and means for regulating the speed of the engine by an operator of the vehicle. The regulating means has a plurality of positions including a rest position in which the engine is at idling speed and an operative position in which the engine is above idling speed. The vehicle further comprises a manual transmission, a clutch for coupling the engine to the transmission, and means for automatically controlling the clutch. The clutch is movable in a first direction to engage the transmission and in a second direction to disengage from the transmission, and the clutch has a predetermined position in which the clutch engages the transmission with a predetermined force such that the vehicle begins to creep. The controlling means includes means for moving the clutch to the predetermined position under predetermined conditions in which the vehicle is in gear and at a standstill or almost so, the engine is running and the regulating means is in the rest position. The regulating means can comprise a gas pedal, for example.

Another aspect of the invention resides in a method of operating a vehicle having an engine, a manual transmission and a clutch for coupling the engine to the transmission. The method comprises the steps of idling the engine while the vehicle is in gear and at a standstill or almost so, and automatically engaging the clutch with the transmission in such a manner that the vehicle begins to creep.

According to the invention, after the vehicle is stopped by means of the foot brake or hand brake, the vehicle begins to creep if the engine is running and the vehicle is in gear. The operator of the vehicle thus does not even think of leaving the vehicle so that safety is increased. Creeping of the vehicle also provides greater comfort and better handling characteristics during parking, shifting and starting off on icy roads because greater sensitivity is achieved.

It is of advantage for the clutch to be moved in the direction of opening, i.e., in the direction of disengagement from the transmission, if the foot brake and/or hand brake is applied during creeping. The moment or torque being transferred is thereby reduced. The clutch may be steadily or abruptly urged in the direction of disengagement, e.g., to a standby, waiting or offset position which the clutch assumes preparatory to engaging the transmission.

When the vehicle is stationary or practically stationary and is placed in gear with the brake applied and the gas pedal at rest, the clutch may be held in a position, i.e., the standby position, which is set back from the predetermined position of the clutch during creeping.

If neither the brake nor the gas pedal is applied during creeping so that the vehicle is in an idling mode, the clutch can be continuously urged in the direction of closing, that is, in the direction of engagement with the transmission. This prevents the clutch from overheating by the relatively great slippage which accompanies steady creeping. The speed of the vehicle thus increases continuously.

The standby position may be obtained by determining the so-called initial engagement point of the clutch at which the clutch just begins to transfer moment and automatically adding a small setback or offset to this point in the direction of disengagement. The resulting value can be stored in electronic hardware, e.g., an electronic memory or a computer, and recalled from there as necessary or sent to an appropriate receiver.

When the vehicle is stationary or practically stationary with the engine running and both the gas pedal and brake inoperative, the clutch may be moved out of a position of disengagement in response to shifting of the vehicle into gear. Advantageously, the clutch is continuously urged in the direction of engagement so that the vehicle begins to creep and slippage is steadily reduced. Due to the reduction in slippage, the speed at which the vehicle creeps increases constantly. Urging of the clutch in the direction of engagement can be interrupted when the brake is applied and the clutch may be shifted in the direction of disengagement, e.g., to the standby position.

The clutch may automatically move into engagement with the transmission after the engine is shut off. It is of particular advantage for the clutch to engage the transmission when the vehicle is in gear to thus reliably lock the transmission. If the vehicle is in gear when the engine is shut off, movement of the clutch into engagement with the transmission preferably occurs with a short delay following engine shutdown because the engine can continue running after the ignition is shut off.

After starting of the engine, which favorably can take place only in neutral, the clutch may be moved into a position downstream of the initial engagement point as considered in the direction of disengagement. By way of example, this position can be the fully open or disengaged condition or position of the clutch. Upon shifting of the vehicle into a starting gear, i.e., low gear, the clutch is moved into the standby position. Such changes in the condition of the clutch can occur, for instance, in response to detection of a particular gear by a gear detection unit.

As mentioned previously, if the vehicle is in gear and the gas pedal is inactive, the clutch can move out of a disengaged position, such as the standby position, in the direction of engagement. The clutch may be steadily urged in the direction of engagement so that the vehicle begins to creep. Displacement of the clutch in the direction of engagement is preferably regulated, and movement of the clutch from the standby position to the initial engagement position and/or from the initial engagement position to a more firmly engaged or fully engaged position may take place in accordance with a moment-time function or in dependence upon the slippage between the engine and the transmission. The larger of the slippage and the moment-time function controls the displacement of the clutch.

Movement of the clutch in the direction of engagement, e.g., from the standby position to the initial engagement position and/or from the initial engagement position to the fully engaged position, can occur without direct determination of the speed of the transmission. Thus, instead of measuring the transmission input speed directly, a value representing this input speed is derived from the speed of the vehicle. For example, a signal indicative of the speed of the vehicle can be obtained from a control unit such as a digital engine electronics unit. The speed achieved downstream of the clutch along the path of force transfer from the engine to the transmission, i.e., the transmission input speed, can be calculated by taking into account the gear in which the vehicle is operating and the corresponding gear ratio. The electronic hardware can calculate the transmission input speed very simply inasmuch as a signal representative of vehicle speed is always available and the gear ratio which can be stored in the electronic unit allows a backward computation to be performed. The gear in which the vehicle is operating is obtained from the so-called gear detection unit. With such an arrangement, a sensor for determining the transmission input speed can be eliminated and no changes need be made in the manual transmission when using an ECM system according to the invention.

The initial engagement point corresponds, at least approximately, to the position of the clutch when the vehicle begins to creep. Advantageously, the starting position of the clutch for the engagement procedure, which takes place after engine start-up, is the initial engagement point corrected by the offset.

The displacement of the clutch can be measured by an element of the release system which is remote from the clutch operating means, such as the release bearing. In a fluid-operated release system, e.g., a hydraulic system, the displacement can be directly and indirectly measured by the master cylinder. To this end, the rod of the hydraulic cylinder can activate a lever which is pivotally connected to a rotary potentiometer. This type of measuring system is of particular advantage because no changes need be made to the transmission jacket or bell. However, a volume change of the hydraulic fluid due to temperature variations is unavoidable. Hence, the relationship between the actual clutch position at the slave cylinder and the clutch position as measured by the master cylinder may be in error, at least until volume compensation takes place via an equalizing bore which connects the working fluid with a supply vessel for hydraulic fluid. The hydraulic clutch operating system can be connected to the brake fluid circuit.

To compensate for, or rule out, such errors, the initial engagement point may be determined by more than one method.

One method of determining the initial engagement point takes place with the vehicle in neutral and at a standstill or almost so. The initial engagement point obtained under these conditions may be referred to as a stationary initial engagement point, and the determination of this engagement point is advantageously performed periodically.

A second stationary initial engagement point can be established in addition to, or instead of, the first such engagement point described above. The second stationary initial engagement point is determined with the foot brake applied and the vehicle in gear at a standstill or almost so. It is again of advantage for the determination of the second stationary initial engagement point to be carried out periodically.

The stationary initial engagement points, which may be determined by means of a potentiometer, can be sent to a memory.

In accordance with the invention, another method of determining the initial engagement point is carried out while the vehicle is coasting and/or while the engine is under load. The initial engagement point established during coasting is referred to as the coasting initial engagement point, whereas the initial engagement point determined with the engine under load is referred to as the loaded initial engagement point.

The coasting initial engagement point can be determined with the gas pedal inoperative and the clutch in a position downstream of the standby position in the direction of engagement. The minimum speed of the engine is established, and this can be accomplished by detecting the increase in engine speed which follows a drop in speed, that is, by detecting the first positive gradient. This is a condition where the moment which can actually be transferred by the clutch equals the moment generated by the engine while coasting. The minimum engine speed is related to a specific coasting or braking moment of the engine by means of a characteristic engine curve stored in the electronic hardware. The coasting or braking moment, in turn, is related to the spacing from the potential, i.e., the nearest initial engagement point, via a characteristic clutch curve likewise stored in the electronic hardware.

By way of example, the loaded initial engagement point can be established by integrating the difference in speed between the engine and the transmission, i.e., the slippage, over time. When the resulting integral is a first predetermined amount less than a first value, the initial engagement point is corrected in the direction of engagement. On the other hand, when the integral exceeds a second value by a second predetermined amount, the initial engagement point is corrected in the direction of disengagement.

Similarly to the stationary initial engagement point, the coasting and loaded initial engagement points can be sent to a memory. Advantageously, the stationary initial engagements points are stored in a volatile memory while the coasting and loaded initial engagement points are stored in a nonvolatile memory.

Whether the coasting initial engagement point or loaded initial engagement point is determined depends upon the particular application. In many cases, however, it is of advantage to establish and store both of these engagement points.

A volatile central memory can be provided for the established standby positions. This memory could also serve to store an initial engagement point which, as described above, is adjusted by a predetermined value. The central memory can be connected with the volatile memory for the stationary initial engagement points and the nonvolatile memory for the coasting and loaded initial engagement points. These initial engagement points can then be transferred to the central memory. The values in the volatile memory for the stationary initial engagement points can be recalled by the central memory after each determination, e.g., in response to arrival of the clutch at the standby position.

The stored coasting and/or loaded initial engagement points can be transferred to the central memory in response to complete closing of the clutch, that is, in response to full engagement of the clutch and the transmission. If, for example, the vehicle is to operate in a slippage mode, the coasting and/or loaded initial engagement points may be recalled by the central memory when the clutch is in almost, but not quite, full engagement with the transmission. Transfer of the coasting and/or loaded initial engagement points to the central memory can also take place in response to arrival of the clutch at a position of engagement with the transmission such that the moment transmittable by the clutch exceeds the instantaneous moment of the engine.

Alternatively, the coasting and/or loaded initial engagement points can be recalled by the central memory when the clutch opens completely or almost so, that is, when the clutch is at or near its maximum distance from the transmission. In many cases, it can be of advantage for transfer of the coasting and/or loaded initial engagement points to occur in response to placing of the clutch at into the standby condition.

It is also possible for the coasting and/or loaded initial engagement points to be transferred to the central memory when the master cylinder assumes a condition in which volume compensation takes place, via the equalizing bore, with the hydraulic fluid supply vessel. This is generally the case when the clutch is engaged.

The central memory holds the coasting and loaded initial engagement points in readiness for the control unit or passes them on to such unit.

The latest stationary initial engagement point to be determined can be sent to the central volatile memory just before the clutch becomes engaged. This latest point is erased once the clutch has been engaged for a short period, e.g., one second, and volume compensation has occurred in the hydraulic clutch release system via the equalizing bore. On the other hand, the coasting and/or loaded initial engagement points stored in the nonvolatile or adaptive memory may be transferred to the central memory at this time.

When the engine is shut off, the central memory and the memory for the stationary initial engagement points are erased. In contrast, the coasting and/or loaded initial engagement points present in the nonvolatile memory remain in storage and, when the engine is next started, are fed into the central memory and used to control displacement of the clutch to the position of initial engagement.

Movement of the clutch from a fully, or almost fully, open position to the standby position can be regulated by means of an e-function. During acceleration, movement of the clutch out of the standby position in the direction of engagement can occur in dependence upon a reference speed which, in turn, is a function of the position of the load lever, that is, the gas pedal or accelerator.

When shifting, the displacement of the clutch from the standby position into renewed engagement with the transmission can take place in dependence upon a reference slippage. By means of a time curve or ramp, the reference slippage can be adjusted with respect to a desired final slippage on the basis of the actual slippage at the time of initial engagement. If, for instance, travel is not to occur with a slipping clutch in order to insulate against vibrations, the desired final slippage can be zero.

The moment applied to the clutch may equal or exceed the moment generated by the engine. The engine moment can be determined from the engine speed and the position of the load lever.

The reference moment of the clutch, as determined by the control unit or control algorithm activated under particular operating conditions (creeping and/or acceleration and/or re-engagement), may be converted into a reference displacement via the characteristic curve of the clutch. The reference displacement can be compared with the actual position of the clutch in a displacement control circuit to generate a comparative value. The required reference flow for valve regulation can be determined from this comparative value in a PID controller.

BRIEF DESCRIPTION OF THE DRAWINGS

Additional features and advantages of the invention will become apparent from the following detailed description of preferred embodiments when read in conjunction with the accompanying drawings, wherein.

DESCRIPTION OF PREFERRED EMBODIMENTS

Figure 1B:
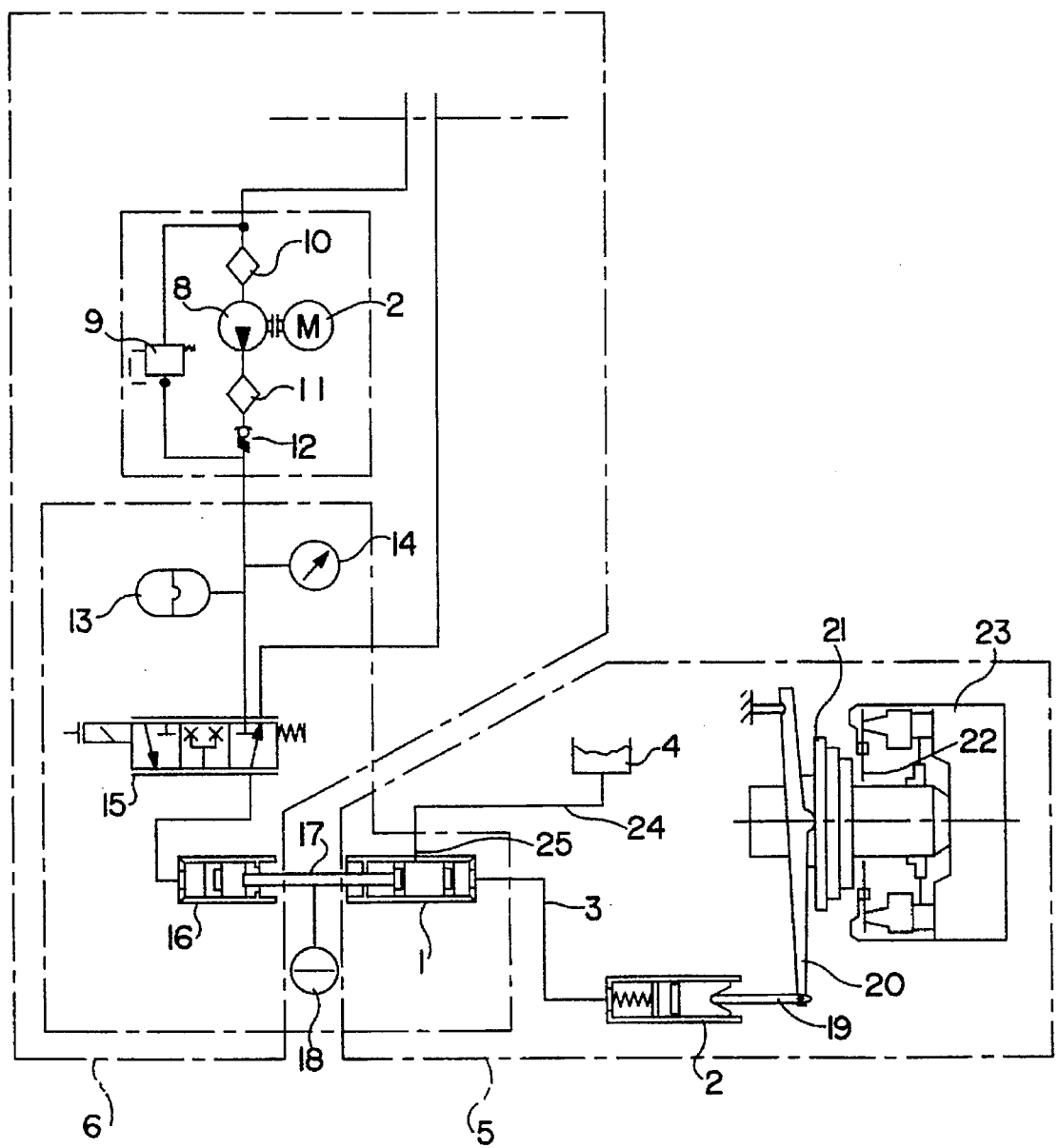
FIG. 1 schematically illustrates components of a motor vehicle equipped with an electronic clutch management system in accordance with the invention.
FIG. 1A is a block diagram of an electronic clutch management system in accordance with the invention.

FIG. 1 shows components of a motor vehicle having a combustion engine, a gas pedal which regulates the speed or output of the engine, a hand brake, a foot brake and a multispeed manual transmission. The vehicle is further equipped with an electronic clutch management system which includes an automatic clutch for coupling the engine to the transmission and a control unit for the clutch.

The reference numeral 5 in FIG. 1 identifies a brake fluid circuit of the vehicle while the reference numeral 6 denotes a hydraulic circuit of the vehicle. The brake fluid circuit 5 has a master cylinder or cylinder-and-piston unit 1 which is connected to a slave cylinder or cylinder-and-piston unit 2 by a hydraulic line 3. The brake fluid circuit 5 further includes a storage or supply vessel 4 which accommodates a body of brake fluid. The master cylinder 1 is provided with an equalizing bore 25 which, by way of a hydraulic line 24, establishes communication between the body of fluid in the master cylinder 1 and the body of fluid in the storage vessel 4.

The hydraulic circuit 6 comprises a combination of a motor 7 and a pump 8, a relief valve 9, filters 10 and 11, and a check valve 12. The hydraulic circuit 6 additionally comprises a memory 13, a pressure sensor 14, a 4/3-way valve (proportional valve) 15 and a master cylinder or cylinder-and-piston unit 16. The master cylinders 1 and 16 share a common piston rod 17 which functions as an input element for the raster cylinder 1. The piston rod 17 operates a rotary potentiometer 18 which generates a signal indicative of the position of the clutch shown at 23.

The slave cylinder 2 has a piston rod 19 which actuates a clutch operating lever 20. The clutch operating lever 20 activates a release bearing 21 which, in turn, operates a plate spring 22 of the clutch 23.

The ECM control 28 includes a program controlled computer or microprocessor 30 that may execute programs according to the flow charts of FIGS. 4 and 6–8.

Figure 2:
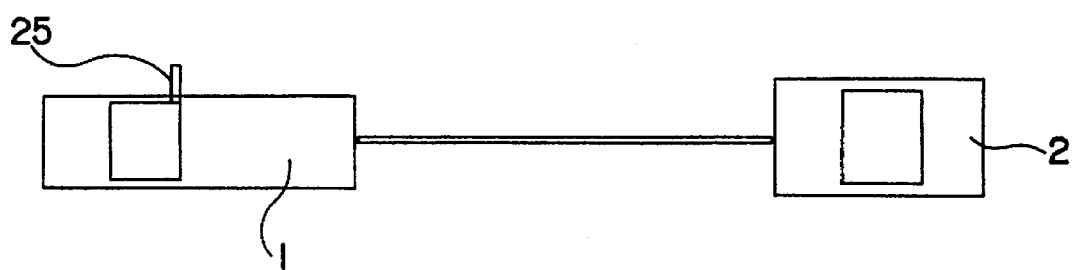
FIG. 2 shows a master cylinder and a slave cylinder forming part of the vehicle of FIG. 1, the master cylinder having an equalizing bore which is blocked.
Figure 3:
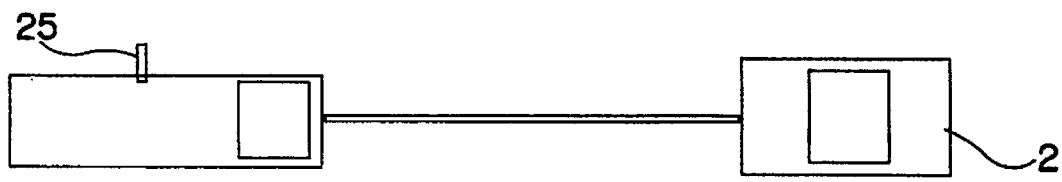
FIG. 3 is similar to FIG. 2 but with the equalizing bore unblocked.

As shown in FIG. 2, a piston riding inside the master cylinder 1 can assume a position in which the equalizing bore 25 is blocked so that no fluid transfer can take place between the master cylinder 1 and the storage vessel 4. When this piston is displaced to the right in the illustration of FIG. 2, the equalizing bore 25 becomes unblocked as in FIG. 3. Fluid exchange can now occur between the master cylinder 1 and the storage vessel 4. The equalizing bore 25 permits pressure equalization of the fluid in the master cylinder 1 and that in the storage vessel 4 to take place. In this manner, it is possible to compensate for volume changes undergone by the fluid in the master cylinder 1 due to temperature fluctuations.

An important function of the electronic clutch management system according to the invention is to cause the vehicle to begin creeping when the vehicle is in gear and at a standstill or almost so, the engine is running and the gas pedal is at rest. This prevents the operator of the vehicle from entertaining any thought of leaving the vehicle.

The electronic clutch management system of the invention and its operation will now be described in greater detail.

When the vehicle begins to move, the increase in moment is determined by three independent calculations. These calculations are carried out by a predictor 32, a disengagement controller 36, and a creep controller 38, respectively. Each of these units, which may in fact be implemented as separate units or programs in computer 30, calculates a reference moment and the maximum moment is taken as the acceleration moment.

Figure 4:
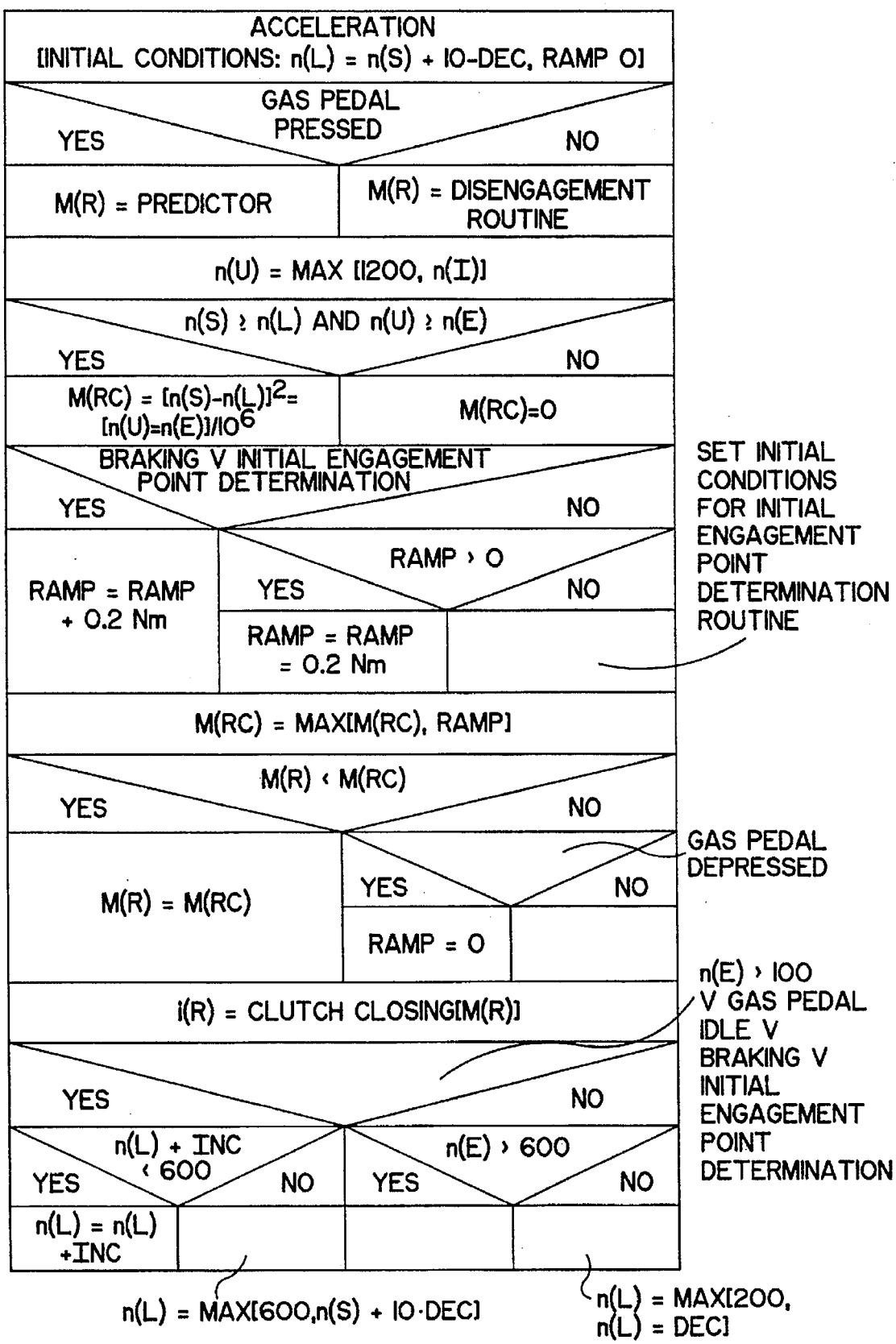
FIG. 4 is a flow chart illustrating the operation of a creep controller, which constitutes part of the electronic clutch management system of the vehicle of FIG. 1, as the vehicle begins to move.

FIG. 4 is a flow chart illustrating the operation of the creep controller as the vehicle begins to move. Here:

n(L)=lower speed limit (rpm), n(U)=upper speed limit (rpm), n(I)=initial speed (rpm), n(E)=engine speed (rpm), n(S)=filtered slippage between engine and transmission (rpm), M(R)=reference frictional torque or moment (Nm), M(RC)=reference frictional moment of creep regulator (Nm), INC=positive incremental change in lower speed limit (rpm), and DEC=negative incremental change in lower speed limit (rpm).

When the vehicle begins moving for the first time, the following initial conditions are set for the creep regulator:

lower speed limit n(L)=actual slippage+offset moment-time function=0.

The creep controller 38 is composed of an n-squared regulator 35, and a moment-time ramp generator 37 which produces a line having a slope of 20 Nm/s. The n-squared regulator determines a moment from the engine speed and a value calculated back from the transmission speed. The maximum moment is taken as the creep moment.

The moment from the ramp generator 37 increases when neither the gas pedal nor the brake is activated. If the foot brake or hand brake is applied, the moment decreases at the same rate as it increased. The ramp generator serves to urge the clutch towards the fully closed or engaged position in the event that the vehicle creeps for an extended period, even when the moment from the n-squared regulator approaches zero because of the decreasing slippage. The n-squared regulator 35 alone would produce a constant slippage which, over an extended period of creep, could result in excessive wear of the clutch.

The reference frictional moment when controlling the initial movement of the vehicle with the predictor is indirectly dependent upon the throttle valve. As a rule, the predictor 34 operates when giving gas. Otherwise, the disengagement controller determines the variation of the reference moment. In the event that acceleration is interrupted, the disengagement controller is activated to reduce the moment from the predictor to the creep moment.

The n-squared regulator 35 operates in accordance with the following equation:

$$M(RC)=[n(S)-n(L)]\times[n(S)-n(L)\times[n(U)-n(E)].$$

The upper speed limit n(U) causes the moment to decrease as the engine speed increases, that is, as gas is given. When the upper speed limit n(U) is exceeded, the moment goes to zero. This means that a moment is generated immediately by the n-squared regulator but that, upon giving gas, this moment is soon exceeded by the moment from the predictor which then determines the moment by itself. A prerequisite for a "comfortable" take-over by the predictor is a small difference between the gradients of the two reference moments at the transfer point.

The lower speed limit n(L) causes the moment to increase during creep as long as no gas is given and causes the moment to decrease when the brake is applied. The lower speed limit n(L) is set to an initial value of actual slippage plus offset when the condition "acceleration" is initiated. The additional offset causes the clutch reference position to vary according to an e-function from the starting position of the clutch to the initial engagement point so that the actual position of the clutch does not result in an excessive moment. The lower speed limit n(L) decreases when the engine speed falls below 1000 rpm with the gas pedal at rest thereby leading to an increase in the reference moment. To prevent the engine from stalling, the lower speed limit n(L) stops decreasing when the engine speed drops to 600 rpm. Consequently, the reference moment is increased no further.

When the predictor 34 assumes control due to an increased reference moment, the ramp generator is set to zero for as long as the predictor prescribes the larger reference moment. The lower speed limit n(L) is increased to its maximum when the gas pedal is depressed. Accordingly, the reference frictional moment from the n-squared regulator 35 decreases to assure a reliable takeover from the predictor. The n-squared regulator is internally set to its initial condition if acceleration of the vehicle is interrupted without leaving the acceleration mode.

DETERMINATION OF INITIAL ENGAGEMENT POINT

It is assumed here that the position of the clutch is measured at the master cylinder in the hydraulic unit rather than at the slave cylinder at the transmission jacket or bell. The temperature-dependent volume change of the column of brake fluid intermediate the master cylinder and the slave cylinder falsifies the relationship between the actual clutch position (as detected at the slave cylinder) and the measured clutch position (as determined at the master cylinder) so long as the clutch is at least partially open (disengaged). Thus, the equalizing bore in the master cylinder is blocked during this time. Upon closing (engagement) of the clutch, the system is equalized due to volume compensation via the equalizing bore. The volume change caused by temperature can make a difference of several millimeters in the stroke of the master cylinder after only a few minutes of standstill with the engine running.

The position of the clutch as detected at the master cylinder is constantly regulated when the clutch is open or disengaged, that is, the piston in the slave cylinder moves as the column of brake fluid heats up and the clutch is opened further (this can result in excessive pressurization of the clutch). This process has no effect on the control means. Hence, there is a qualitatively strong influence on the next acceleration procedure.

As a rule, an initial engagement point which is off by 0.5 mm is already subjectively noticeable in all operational modes (creeping, acceleration, re-engagement, and disengagement for shifting or coming to a standstill).

The following procedure is programmed into the control means in order to maximize the precision of the established initial engagement points. A distinction is made between a stationary initial engagement point, a coasting initial engagement point (stored in the background) and an actual initial engagement point (used for control).

In principle, there are two possibilities if the vehicle is stationary with the engine running. There are:

1. The operator has placed the vehicle in neutral.
2. The operator has placed the vehicle in gear and is stepping on the brake (or has applied the hand brake) so that the vehicle does not begin to creep.

In the first case, it is possible to close (engage) the clutch and thereby unblock the equalizing bore so that volume compensation takes place. To this end, the clutch is cyclically closed, e.g., every 30 seconds, for 1 second. When the operator begins to shift or leaves neutral, this process is interrupted and the clutch opens (disengages) immediately. Once the volume compensation has been terminated, the actual initial engagement point is set equal to the coasting initial engagement point.

In the second case, no equalization can occur. Hence, the initial engagement point is updated periodically, e.g., every 30 seconds. The clutch is slowly closed (moment increase as during creep) until the engine speed has decreased by 80 rpm. The initial engagement point obtained in this manner is stored as the stationary initial engagement point. If the engine speed does not drop by the required amount, the determination is interrupted after a predetermined time, e.g., 1.27 seconds, for safety. In accordance with the calculation, this time corresponds to an initial engagement point displacement of 0.5 mm and is taken as such. This displacement equals the deviation of ±0.5 mm which is written into the program and represents the maximum permissible difference between the stationary initial engagement point and the actual initial engagement point.

Following the determination, the moment is again slowly decreased to zero (as when creeping is terminated). After the clutch opens to a position corresponding to the initial engagement point plus offset, the actual initial engagement point is set equal to the stationary initial engagement point.

If the operator of the vehicle now wishes to begin creeping or moving at a faster pace, the actual initial engagement point for such acceleration has already been established. Should the clutch be closed for a minimum of 1 second during shifting or after acceleration has ended so that equalization or volume compensation occurs, the coasting initial engagement point is taken as the actual initial engagement point similarly to case (1) above.

The determination of the coasting initial engagement point is performed when the clutch is engaged while coasting. The last equalization must have occurred within a predetermined interval, e.g., within the last 30 seconds, but this poses no limitation in practice since such is normally the case. The maximum permissible difference between the coasting initial engagement point and the actual initial engagement point is ±0.2 mm.

The coasting initial engagement point is stored as an adaptive parameter when the system is shut off and is taken as the actual initial engagement point upon activation.

The switch to a newly established initial engagement point should occur only when the clutch is completely open or completely closed since an abrupt change in the initial engagement point during clutching causes an abrupt change in the moment which can be transferred.

A. Determination of Initial Engagement Point at Standstill

The determination of the initial engagement point when the vehicle is stationary involves an analysis of the variation in speed and a resulting estimation of the initial engagement point.

Under specific initial conditions, the clutch always begins to close at the same relatively constant speed due to the mode of operation of the creep controller.

Figure 5:
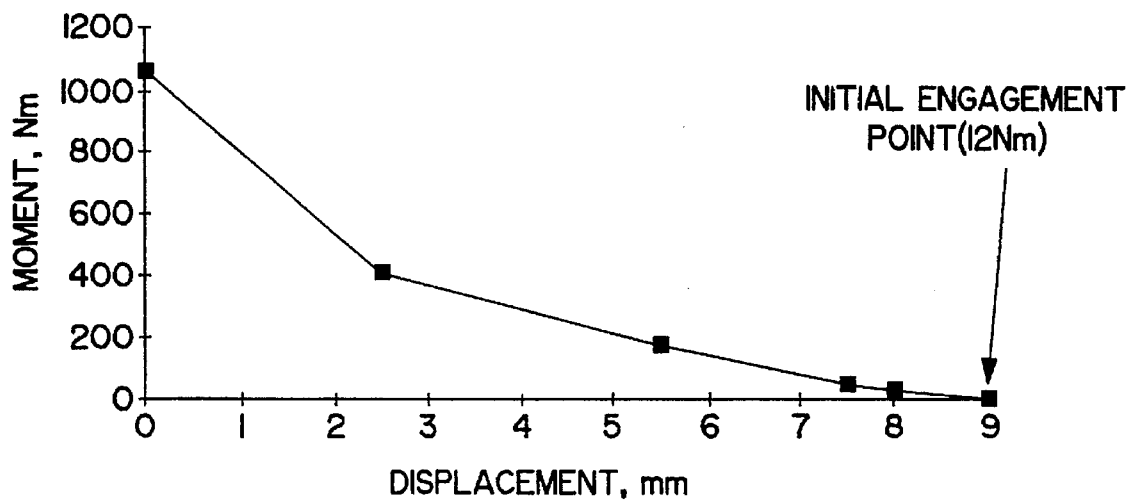
FIG. 5 shows a characteristic curve for a clutch.

If no gas is given and the idle regulator has not yet been activated, the engine speed drops as soon as moment begins to be transferred during closing of the clutch. With a correct initial engagement point and a flat road, a drop of 80 rpm is always achieved in approximately the same time span assuming a variation of ±50 rpm in idling speed. With reference to FIG. 5, if the initial engagement point in the vehicle is shifted to the left from the illustrated characteristic curve of the clutch, which is the curve used by the computer of the electronic clutch management system, this time span is increased since the activator, which operates at a constant displacement speed, must cover a greater distance from the starting position. The time span is reduced when the initial engagement point is shifted to the right.

The displacement of the initial engagement point can be calculated from the following equation:

$$\Delta IEP = [\Delta t - \Delta t(nom)] \times i(nom).$$

Here:

$\Delta IEP$=shift in initial engagement point, $\Delta t$=measured time span $\Delta t(nom)$=nominal time span, and $i(nom)$=initial speed of clutch.

The determination of the initial engagement point can be performed both with the foot brake depressed and with the hand brake on. Furthermore, determination of the initial engagement point can be carried out only with the clutch slipping. To hold down clutch wear, determination of the initial engagement point at standstill is performed at most every 30 seconds.

The algorithm for initial engagement point determination, which can be written as an independent subroutine, should always be called up in the acceleration mode. The initial conditions for this algorithm are likewise set whenever the acceleration mode is initiated, and also during the acceleration mode when the ramp generator is at zero, i.e., when creep has not yet begun.

Figure 6:
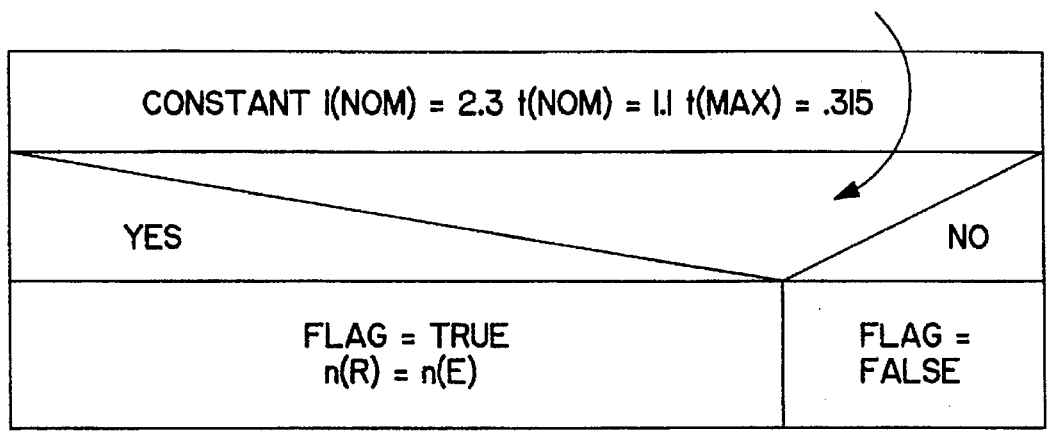
FIG. 6 shows a flow chart of an algorithm for setting initial conditions for a determination of the initial engagement point of a clutch while a vehicle is stationary or almost so.
Figure 7:
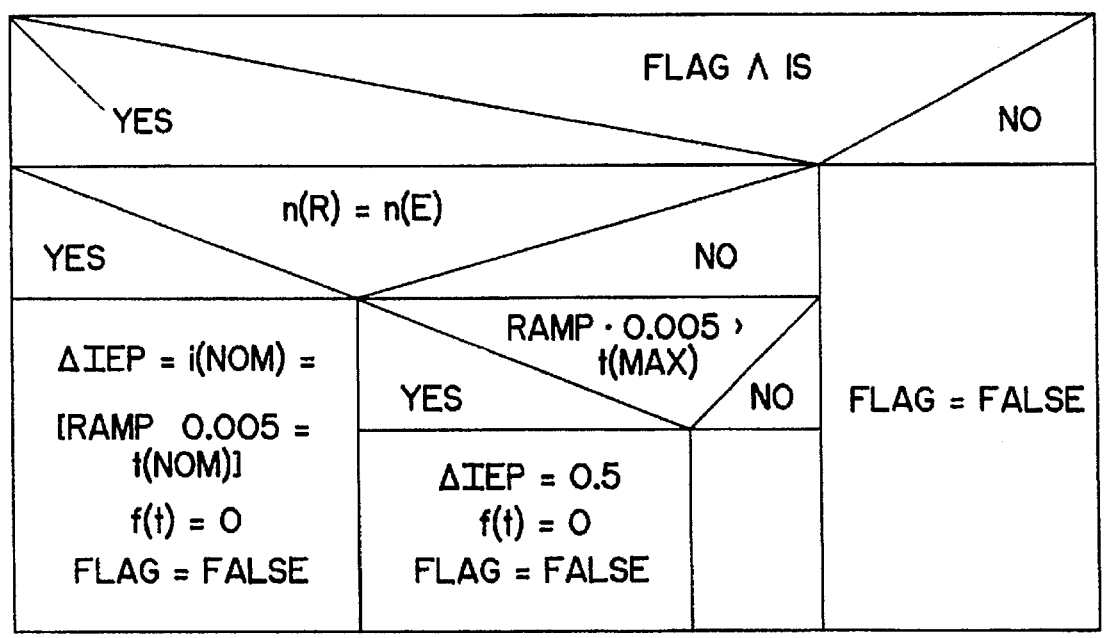
FIG. 7 shows a flow chart of an algorithm for determining the initial engagement point of a clutch while a vehicle is stationary or almost so.

FIG. 6 shows a flow chart for implementing the algorithm for setting the initial conditions while FIG. 7 shows the flow chart for the algorithm for initial engagement point determination. Here:

n(E)=engine speed (rpm), n(R)=engine speed when starting initial engagement point determination and used as a reference to establish the drop in engine speed (rpm), n(I)=idling speed (rpm), n(V)=vehicle speed (km/h), $\Delta IEP$=shift in initial engagement point relative to the last established initial engagement point (mm), i(nom)=initial speed of clutch (mm/s), t(nom)=time for the engine speed to drop from the idling speed to the reference speed when the creep controller begins to operate (s), t(max)=maximum time to interruption of initial engagement point determination (s), f(t)=variable time function(s), ramp=value of function produced by ramp generator of creep controller, FLAG=logical variable, and IS=idle switch.

The initial speed i(nom) of the clutch is a nominal value obtained from measurements. Similarly, the time t(nom) for the engine speed to fall off to the reference speed is a nominal value derived from measurements. The reference speed can, for example, equal 650 rpm.

The maximum time t(max) to interruption of the initial engagement point determination is important in order to limit the shift $\Delta IEP$ in the initial engagement point to 0.5 mm. With respect to the variable time function f(t), initial conditions for this function are set when equalization or volume compensation takes place and when determination of the initial engagement point has ended. Like the function f(t), the function produced by the ramp generator constitutes a variable time function.

The logical variable FLAG allows determination of the initial engagement point to proceed when the initial conditions are no longer satisfied and is negated as soon as the determination has been completed. As regards the idle switch, the statement TRUE applied to this switch implies that no gas is being given.

The initial conditions in the present case (engine speed approximately equal to idling speed and vehicle virtually at a standstill) limit the frequency of the initial engagement point determination. Furthermore, it is only with these initial conditions that the nominal adjustment speed i(nom) of the clutch can be achieved for the correct engagement point. This is significant for reproducibility.

B. Determination of Initial Engagement Point When Re-Engaging the Clutch During Coasting If the engine speed is less than the transmission speed after a gear change, the engine speed increases during the subsequent engagement of the transmission. This occurs during each downshift when coasting and also, at times, when upshifting.

The basis for the initial engagement point determination is that, at the time the engine speed is a minimum (stationary condition, no acceleration of the engine), the moment transferred to the clutch is exactly equal to the instantaneous drag moment of the engine. The drag moment, which is a function of engine speed, can be obtained from the characteristic curve of the engine. In turn, a clutch position can be associated with the drag moment via the characteristic curve of the clutch. A position in which zero moment is transferred can be calculated from the clutch position.

Figure 8:
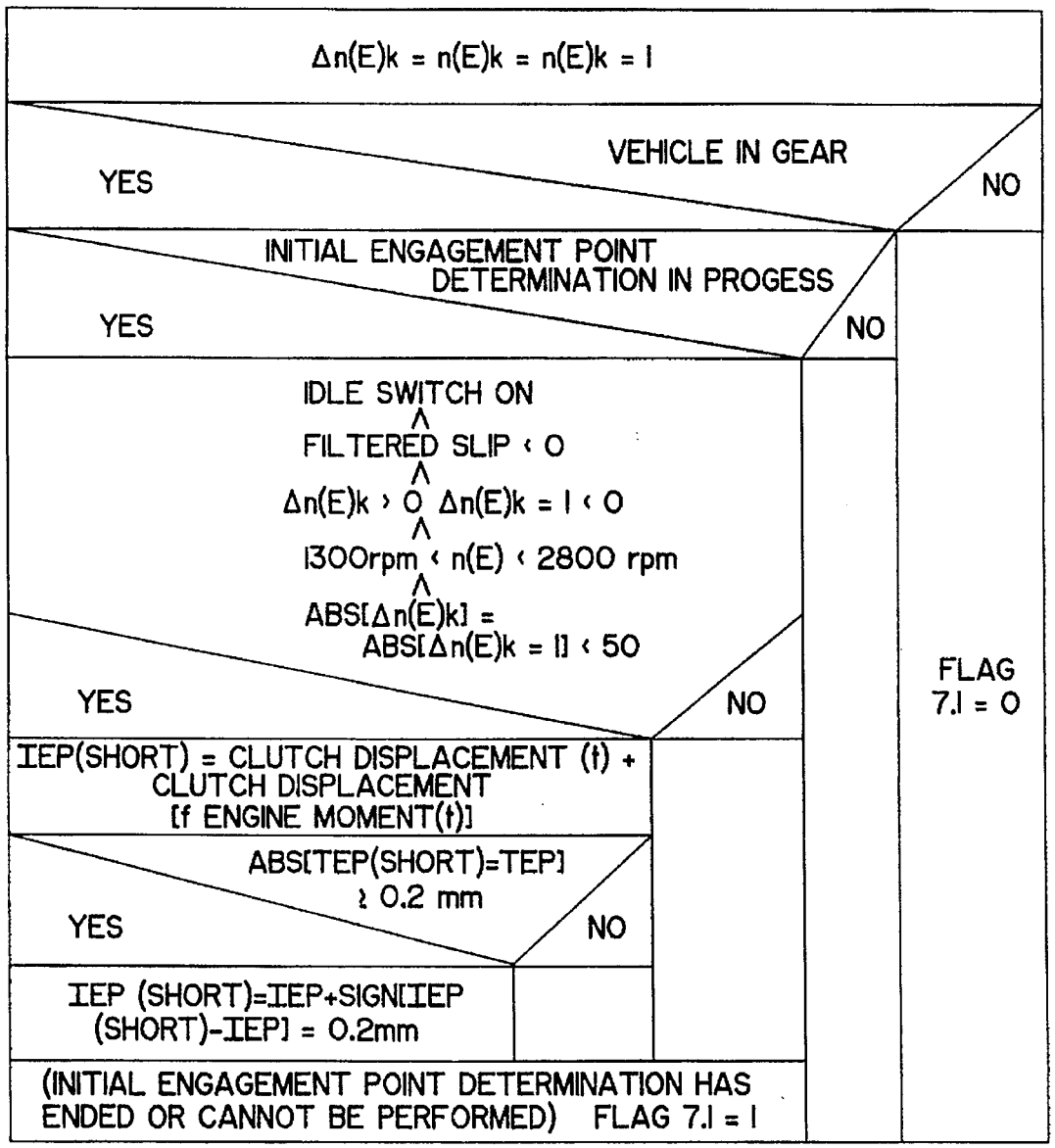
FIG. 8 shows an a flow chart of algorithm for determining the initial engagement point of a clutch while coasting.

FIG. 8 shows a flow chart for implementing an algorithm for the determination of the initial engagement point while coasting.

Several conditions must be fulfilled in order for the determination to take place properly:

1. At the time that the initial engagement point is determined, the filtered slippage must be negative constantly (transmission speed greater than engine speed).

2. The idle switch must be active (DK=0 degrees) so that the drag moment is not compensated by the engine moment.

3. The engine speed should not drop below 1300 rpm because the idle regulator could otherwise increase the speed of the engine (drag moment then is not obtainable from the characteristic curve of the engine).

4. The engine speed should not exceed 2800 rpm so that the coasting moment does not become too large (the determination should take place as close to the initial engagement point as possible to reduce the effects of errors in the characteristic curves).

The initial engagement point is determined at the time that the gradient for the engine passes through zero. To eliminate erroneous measurements, the gradient should not be greater than approximately 83 revolutions per second squared. The new value can deviate from the average initial engagement point by at most ±0.2 mm.

C. Determination of Initial Engagement Point When Re-engaging the Clutch With the Engine Under Load Determination of the initial engagement point when re-engaging the clutch while the engine is under load can be performed, for example, by integrating over time the difference between the engine speed and a value calculated back from the transmission speed. If the integral exceeds a predetermined maximum value, the initial engagement point is shifted in the direction of engagement of the clutch. On the other hand, when the integral is less than a predetermined minimum value, the initial engagement point is shifted in the direction of disengagement of the clutch.

SAFETY CONSIDERATIONS FOR HYDRAULIC ACTUATOR

A. System Monitoring

A detailed FMEA error checking routine for the electronic clutch management system is performed. Differentiation between three types of failures has been found necessary:

1. Failure of a sensor.
2. Processor failure or failure of more than one sensor.
3. Failure of the voltage supply, output stages or hydraulic fluid supply.

The electronic clutch management system recognizes two emergency operating conditions, namely, emergency software and emergency hardware. Control lights indicate whether the system is operating in an emergency mode.

More serious malfunctions are indicated by a rapidly blinking light, e.g., blinking frequency of approximately 4 Hz. This is the case for:

a. A pressure drop.
b. Emergency hardware operation due to
  (i) processor failure,
  (ii) failure of the sensor for clutch position, and
  (iii) failure of multiple sensors.

Less serious malfunctions are indicated by a steady light. This is the case for a failure of a single sensor other than that for the clutch position.

The warning lights inform the operator of the vehicle that the system functions have been affected or limited.

Table 1 gives an overview of the different operating conditions for the electronic clutch management system and the effects on clutch control.

TABLE 1

Operating Conditions For ECM System And Effects On Vehicle

| Operating Condition | Effect On Vehicle | Cause |
| --- | --- | --- |
| normal | automatic clutch control during acceleration and shifting specialized clutch control to optimize tip-in and back-out reactions in the vehicle | no malfunction |
| emergency software | normal automatic clutch control during acceleration and shifting with reduced comfort tip-in and back-out control inhibited (clutch remains closed) | failure of sensor (except clutch position sensor) |
| emergency hardware | starter lock released timed activation and deactivation of electric pump clutch closes at engine speed of less than 300 rpm clutch position a function of throttle valve angle at engine speed greater than 400 rpm (clutch opens at small throttle valve angles and closed at large throttle valve angles) warning light goes on | processor failure failure of clutch position sensor failure of more than one sensor |
| system shutdown | clutch closes | voltage supply failure (cable or voltage regulator) malfunction of proportional valve output stage malfunction of pump relay output stage failure of hydraulic fluid supply |

SENSOR FAILURE

There is a continuous reasonableness check of the sensor signals. If an error is detected, an appropriate emergency operating program is activated. The software emergency circuit is established for the failure of a single sensor other than the clutch position sensor. With the emergency software circuit, the basic functions can be performed, that is, automatic operation of the clutch for acceleration and gear changes is possible. However, comfort is decreased. If two or more sensors fail at the same time, or if the clutch position sensor fails, the emergency hardware circuit is activated.

PROCESSOR FAILURE

The processor is monitored by an external watchdog. In the event that the processor can no longer set back the watchdog timer due to the crash of a program, the watchdog resets the processor. When the processor is reset, clutch control is automatically switched to a hardwired control circuit constituting the so-called emergency hardware circuit.

VOLTAGE SUPPLY, OUTPUT STAGE OR HYDRAULIC FLUID SUPPLY FAILURE

These serious failures result in a system shutdown which, in turn, causes the clutch to close.

B. Emergency Circuits
Software emergency circuit

When at least one error is entered in the error memory, the flag "SW Emergency Circuit" is set and the warning light glows continuously (with the exception of a pressure drop where the warning light blinks rapidly, e.g., with a frequency of approximately 4 Hz). The operating mode "pulling" is blocked.

TABLE 2

Types Of Error Signals, The Actions Caused By The Error Signals And The Effects of The Error Signals

| Type of signal | Action due to signal | Effect of signal |
|---|---|---|
| engine speed | reversion to auxiliary engine speed | none |
| transmission input speed | compensating value n(GD) equals 0 per minute gear detection restricted (differentiation between first gear, second gear and neutral only | temperature protection measures initiated acceleration protection for high gears inoperative clutch opens with gas pedal at rest (freewheeling action) re-engagement with engine under load uncomfortable protection against excessive rpm inoperative |
| tach speed | compensating value n(V) equals 0 per minute gear detection restricted as above | softer engagement in high gears |
| throttle valve | compensating value a (DK) equals 5 degrees | speeds upon acceleration independent of throttle valve angle re-engagement unadjusted (either too soft or too hard depending upon the situation rapid, uncomfortable disengagement |
| gear position transmitter | compensating value set to first gear range starter lock deactivated | softer engagement in high gears transmission grinding and transmission damage possible |
| pressure sensor | pump cycling operates 50% of the time | none |
| switch for signalling intention to shift | flag for indicating intention to shift set to FALSE | increased shifting force for changing gears in neutral |
| idle switch | idle switch set to FALSE at DK greater than 5 degrees | acceleration poorly controllable (only creeping acceleration or acceleration at DK greater than 5 degrees are possible) |

The actions instituted in response to error signals are terminated when the flag "SW Emergency Operation" is erased. This occurs when there is no longer any malfunction and the vehicle is in neutral or the clutch closed. The actions are terminated only in the uncritical conditions of neutral or engaged clutch so that the return to normal operation will not be noticeable by the operator of the vehicle.

The error signals relating to gear position and the idle switch constitute exceptions. The actions instituted in response to these error signals are terminated as soon as the corresponding malfunctions no longer exist. With malfunctions of this type, cancellation of the compensating values when the malfunctions are no longer present is uncritical even when the vehicle is not in neutral.

HARDWARE EMERGENCY CIRCUIT

The system contains a hardwired emergency control unit 40. To maintain system pressure, the electric pump 8 is cycled at a fixed rate, e.g., 10 seconds on, 10 seconds off, 10 seconds on, etc. The clutch closes (locks for parking and protects against unintentional rolling) when the engine speed is below a minimum value (stationary engine). When the engine runs, the clutch is directly controlled by way of the throttle valve signal. Thus, the clutch opens at small throttle valve angles and closes at large throttle valve angles. The pulse width-modulated signal of the throttle valve is directly used for valve control.

The emergency control circuit allows travel to continue with little danger until the next stop. Subsequent acceleration is not possible in all cases. Thus, although closing of the clutch 23 can be controlled by means of the gas pedal, the precision is very limited.

Starting of the engine is prevented when the emergency control unit is operative. Deactivation of the starter lock is possible only by plugging in a bridging conductor.

The hardware emergency circuit 40 becomes active when the system detects the failure of more than one sensor or when the clutch position signal is faulty or missing. A special operating condition of the software control unit ("Shut Down") transfers control of the system to the hardwired emergency control unit. Operation with the emergency hardware circuit is not reversible in this case and can be terminated only by shutting off the control system (ignition off, driver's door closed).

Proper functioning of the software control unit is monitored by a so-called watchdog 42. When the processor does not send a trigger signal to the external watchdog circuit at regular intervals, the latter activates the emergency hardware control unit and the processor is restarted (reset). If the processor then operates properly once more, emergency hardware operation is terminated.

Generally, the emergency hardware control unit is active during the starting phase of the software system and up to approximately 100 ms after switching on the control unit.

Under the following conditions, the emergency hardware control unit 40 shuts off the engine for a period of up to 3 seconds:

1. Engine speed less than 500 rpm.
2. Foot brake or hand brake applied.

If the bridging conductor for the starter lock is plugged in and an attempt is made to start the engine while the emergency hardware circuit is operative and the foot brake or hand brake is applied, the engine shutdown function of the emergency hardware circuit prevents the engine from starting. However, since the shutdown function remains active for a maximum of 3 seconds, the engine can nevertheless be started after a short delay.

DEACTIVATION OF STARTER LOCK

The starter lock can be circumvented by plugging the bridging conductor into the starter release plug. When the bridging conductor for the starter is plugged in, the system warning light blinks rapidly, e.g., with a frequency of about 4 Hz. If the bridging conductor is removed immediately after the engine is started, the system warning light blinks until the next time the control unit shuts off.

C. Diagnostic Function

The basis of self-diagnosis is error detection:

All input and output signals are checked for errors. For input signals, errors are entered in the error memory when the signals are out of the physically meaningful range. The logical level is checked for agreement with the measured level in the case of output signals.

The input signals are additionally monitored for functional errors. Such monitoring includes:

1. Checking for excessively long pump operation or pump cycles.
2. Checking for unacceptable differences between the reference and actual positions of the clutch (clutch position sensor).
3. Checking the relation between the engine speeds DME 1 and DME 2.
4. Checking whether flow through the valve is in a physically meaningful range.
5. Checking whether both shifting intent signals are present simultaneously, i.e., checking for a fault in the circuit which detects an intention to shift.
6. Checking whether the idle switch operates in dependence upon the throttle valve.
7. Checking the relationship between transmission input speed signal and the tach speed signal.

Every detected error is entered in an error memory which may be part of the nonvolatile processor memory. A number between 1 and 8 is assigned to each error. The numeral 1 denotes that a given error is actually present while higher numerals indicate when a particular error occurred last. When the system is shut off, the numerals associated with all errors which are not actually present are increased by 1 and then stored. Thus, the numeral 2 indicates that the corresponding error occurred during the operating phase before last but is no longer actually present. Numerals between 2 and 7 are interpreted in the same way, e.g., the numeral 5 denotes that the associated error did not occur again during the last 5 operating phases. The numeral 8 shows that the respective error occurred at least once since the last erasure of the error memory but did not arise during the last 7 operating phases.

Readout of the error memory

The output of the error memory takes place via the system warning light using a blinker code. To prepare for a diagnostic output, the bridging conductor is placed in the diagnosis plug. The diagnostic output is initiated by depressing the foot brake for more than 2.5 seconds with the ignition on.

A bright phase lasting for 2.5 seconds occurs at the beginning of the diagnostic output. The blinker code readout of the errors in the error memory is then initiated. The error code has three places. The first two identify the type of error while the third contains the numeral indicating the last occurrence of the error. The individual flashes which represent the number for one of the places of an error code are separated by a short dark phase, the individual places of an error code by a dark phase of medium duration and the codes for consecutive errors by a long dark phase.

The warning light is extinguished upon completion of the diagnostic output. The diagnostic output can be repeated by depressing the foot brake. Depression of the foot brake during the diagnostic output is ignored, that is, the diagnostic output is not restarted.

The error memory is erased when the ignition is switched on following removal of the bridging conductor from the diagnosis plug.

D. Engine Shutdown

The engine can shut down in any of the situations depicted below.

1. Extreme Shifting of the Initial Engagement Point During Operation

The engine shuts down under either of the following conditions when the vehicle is stationary for longer periods of time while in gear:

i. Zero point minus initial engagement point less than 3 mm.
ii. Maximum clutch displacement minus initial engagement point less than 1 min.

2. Emergency Software Operation

The engine shuts down under one or the other of the following conditions:

i. Engine speed less than 500 rpm, supply pressure less than 50 bars (no line rupture) and foot brake depressed.
ii. Supply pressure less than 50 bars (no line rupture), hand brake on and activation of the FLAG indicating that the engine has already run. The FLAG must be activated because otherwise engine shutdown could occur when the engine is started.

3. Emergency Hardware Operation

The engine shuts down when the engine speed is less than 500 rpm and either the foot brake or the hand brake is on. If the starter is actuated during emergency hardware operation (starter lock bridged), engine shutdown occurs when the brake is on. However, since the shutdown signal is accepted by the DME for a maximum of 3 seconds, the engine will start after a 3 second delay.

Considerations Relating To Engine Shutdown Upon Extreme Shifting Of The Initial Engagement Point Problem During vehicle operation, temperature effects can lead to situations in which unintentional closing of the clutch can occur due to structural conditions. The situations and their cures are outlined below.

Situation 1

The vehicle is traveling at high speed so that very good cooling of the hydraulic lines takes place. If the vehicle is now brought to a standstill, the hydraulic lines heat up significantly. The brake fluid between the master cylinder 1 and the slave cylinder 2 expands and a shift towards the zero point accordingly occurs in the master cylinder. In the event of a particularly sharp temperature increase (without acceleration), or when the vehicle is next accelerated, there is then the danger of an uncontrolled closing of the clutch 23 if the piston in the master cylinder travels beyond the equalizing bore.

To avoid such danger, the engine should be shut off as soon as the possibility of uncontrolled acceleration arises. The clutch now closes and fluid exchange takes place via the equalizing bore. Normal acceleration is then possible when the engine is restarted.

Situation 2

The clutch is disengaged while the hydraulic lines are very hot. If the hydraulic lines now undergo cooling, the clutch slowly closes. This is detected by the initial engagement point adapter which causes a shift in the master cylinder in a direction corresponding to opening of the clutch. However, it is possible that the distance of travel available to the master cylinder is not sufficient for complete displacement of the clutch. Should the shifting in the master cylinder be terminated by the abutment in the cylinder, the clutch will slowly close due to the cooling of the hydraulic lines.

To prevent this from occurring, the engine should be shut off as soon as the master cylinder has achieved its maximum stroke. The clutch is then closed and fluid exchange can take place via the equalizing bore.

The invention is not limited to the illustrated and described exemplary embodiments but encompasses combinations of individual features and elements discussed in the description and shown in the drawings. Moreover, certain features disclosed in the description and drawings may be novel although not presently recognized as such.

Furthermore, while specific values have been used in the description, these are illustrative only and are not intended to limit the invention in any manner whatsoever.

Various modifications can be made within the meaning and range of equivalence of the appended claims.

What is claimed is:

1. A powered vehicle comprising: an engine; means for regulating the speed of said engine by an operator of said vehicle, said regulating means having a plurality of positions including a rest position in which said engine is at idling speed and an operative position in which said engine is above idling speed; a transmission for transferring torque to wheels of said vehicle; a clutch for coupling said engine to said transmission, said clutch being movable in a first direction to engage said transmission and in a second direction to disengage from said transmission, said clutch having a predetermined position in which said clutch engages said transmission at least with a relatively small force such that said vehicle begins to creep; and means for automatically controlling said clutch, said controlling means including means for invariably moving said clutch to said predetermined position under predetermined conditions in which said vehicle is in gear and at least almost at a standstill, said engine in running and said regulating means is in said rest position.

2. The vehicle of claim 1, further comprising a brake; and wherein said controlling means comprises means for moving said clutch in said second direction when said brake is activated while said clutch is in said predetermined position.

3. The vehicle of claim 1, further comprising a brake; and wherein said controlling means comprises means for continuously urging said clutch in said first direction when said clutch is in said predetermined position under said predetermined conditions and said brake is inoperative.

4. The vehicle of claim 1, further comprising a brake; and wherein said transmission is a manual transmission, said controling means comprises means for placing said clutch in a second position of disengagement from said transmission when said vehicle is put into gear while at least almost at a standstill, said regulating means is in said rest position and said brake is operative.

5. The vehicle of claim 4, further comprising a memory containing a predetermined value, and means for establishing said second position from said predetermined value.

6. The vehicle of claim 5, wherein said predetermined value corresponds to a position of said clutch which is offset in said second direction from a position of initial engagement of said clutch with said transmission.

7. The vehicle of claim 1, further comprising a brake; and wherein said controlling means comprises means for urging said clutch in said first direction and reducing slip when said brake is inoperative, and said clutch is in said predetermined position under said predetermined conditions with said vehicle in low gear.

8. The vehicle of claim 7, wherein said controlling means comprises means for interrupting urging of said clutch in said first direction in response to activation of said brake.

9. The vehicle of claim 8, wherein said interrupting means comprises means for disengaging said clutch from said transmission.

10. The vehicle of claim 1, wherein said controlling means comprises means for displacing said clutch to a second position after said engine is shut off, said second position being downstream of said predetermined position in said first direction.

11. The vehicle of claim 10, wherein said displacing means comprises means for displacing said clutch to said second position while said vehicle is in gear.

12. The vehicle of claim 11, wherein said controlling means comprises means for delaying displacement of said clutch to said second position until after said engine has been shut off.

13. The vehicle of claim 1, wherein said controlling means comprises means for placing said clutch in a second position of disengagement from said transmission after said engine is started and while said vehicle is in neutral, said controlling means also comprising means for displacing said clutch to a standby position between said predetermined and second positions when shifting of said vehicle from neutral into low gear is initiatied.

14. The vehicle of claim 13, wherein said moving means comprises means for moving said clutch from said standby position to said predetermined position under said predetermined conditions.

15. The vehicle of claim 14, wherein said controlling means comprises means for urging said clutch in said first direction and reducing slip when said clutch is in said predetermined position under said predetermined conditions.

16. The vehicle of claim 13, wherein said controlling means comprises means for moving said clutch from said standby position to a position of engagement with said transmission in dependence upon one of a moment-time function and slip.

17. The vehicle of claim 1, wherein said controlling means comprises means for displacing said clutch in said first direction from a position of initial engagement with said transmission to another position in dependence upon one of a moment-time function and slip.

18. The vehicle of claim 1, wherein said controlling means comprises means for displacing said clutch in said first direction from one of a disengaged position into engagement with said transmission, and from one position of engagement into another, without direct determination of the input speed of said transmission.

19. The vehicle of claim 18, further comprising means for calculating slip, when said vehicle is in a predetermined gear, from the speed of said engine and the speed of said transmission, taking into account the gear ratio of said predetermined gear.

20. The vehicle of claim 1, wherein said predetermined position at least approximates the position of initial engagement of said clutch with said transmission.

21. The vehicle of claim 1, wherein said controlling means comprises means for displacing said clutch in said first direction, after said engine is started, from a starting position in which said clutch is disengaged from said transmission, said starting position being offset in said second direction from the position of initial engagement of said clutch with said transmission.

22. The vehicle of claim 1, wherein said controlling means comprises means for releasing said clutch, said releasing means including an operating element for said clutch and another element remote from said operating element, and said other element including means for measuring the displacement of said clutch.

23. The vehicle of claim 22, wherein said releasing means is fluid-operated and said other element comprises a master cylinder.

24. The vehicle of claim 1, further comprising means for determining the position of initial engagement of said clutch with said transmission by more than one method.

25. The vehicle of claim 1, further comprising means for determining the position of initial engagement of said clutch with said transmission when said vehicle is in neutral and at least almost at a standstill.

26. The vehicle of claim 1, further comprising a brake, and means for determining the position of initial engagement of said clutch with said transmission when said brake is activated and said vehicle is in gear and at least almost at a standstill.

27. The vehicle of claim 1, further comprising means for periodically determining the position of initial engagement of said clutch with said transmission.

28. The vehicle of claim 1, further comprising means for determinnig the position of initial engagement of said clutch with said transmission while said vehicle is coasting or while said engine is under load.

29. The vehicle of claim 1, wherein said controlling means comprises: means for placing said clutch in a standby position preparatory to engagement of said clutch with said transmission; and means for determining the position of initial engagement of said clutch with said transmission when said regulating means is in said rest position and said clutch is in another position downstream of said standby position as considered in said first direction, said determining means including means for detecting the minimum speed of said engine while said regulating means is in said rest position and said clutch is in said other position, means for relating said minimum speed to a braking moment of said engine via a characteristic curve of said engine, and means for relating said braking moment to said position of initial engagement via a characteristic curve of said clutch.

30. The vehicle of claim 1, further comprising means for determining the position of initial engagement of said clutch with said transmission while said engine is under load, said determining means including means for integrating the difference in speed between said engine and said transmission over time, and means for making an adjustment in said first direction when the integral is less than a first predetermined value, and an adjustment in said second direction when said integral exceeds a second predetermined value.

31. The vehicle of claim 1, further comprising means for determining the positions of initial engagement of said clutch with said transmission under different conditions, and means for storing said positions of initial engagement.

32. The vehicle of claim 31, wherein said determining means comprises means for establishing at least one position of initial engagement while said vehicle is at least almost at a standstill and said storing means includes a volatile memory for said one position.

33. The vehicle of claim 31, wherein said determining means comprises means for establishing at least one position of initial engagement while one of said vehicle is coasting and said engine is under load, and said storing means includes a non-volatile memory for said one position.

34. The vehicle of claim 31, further comprising means for calculating a standby position which is assumed by said clutch preparatory to engagement of said clutch with said transmission, a volatile memmory for said standby position, and means for transferring said positions of initial engagement from said storing means to said memory.

35. The vehicle of claim 34, wherein said determining means comprises means for periodically establishing at least one position of initial engagement while said vehicle is at a standstill or almost so and said transferring means includes means for sending said one position to said memory in response to arrival of said clutch at said standby position.

36. The vehicle of claim 34, wherein said clutch has a preselected position of almost full engagement with said transmission, said determining means comprising means for establishing at least one position of initial engagement while said vehicle is coasting and said engine is under load, and said transferring means including means for sending said one position to said memory upon arrival of said clutch at said preselected position.

37. The vehicle of claim 34, wherein said clutch has a preselected position in which the moment transferrable between said clutch and said transmission exceeds the moment of said engine, said determining means comprising means for establishing at least one position of initial engagement while said vehicle is coasting or said engine is under load, and said transferring means including means for sending said one position to said memory in response to arrival of said clutch at said preselected position.

38. The vehicle of claim 34, wherein said clutch has a preselected position of full engagement with said transmission, said determining means comprising means for establishing at least one position of initial engagement while one of said vehicle is coasting and said engine is under load, and said transferring means including means for sending said one position to said memory in response to arrival of said clutch at said position of full engagement.

39. The vehicle of claim 34, wherein said clutch has a disengaged position in which said clutch is spaced from said transmission by a maximum distance, said determining means comprising means for establishing at least one position of initial engagement while one of said vehicle is coasting and said engine is under load, and said transferring means including means for sending said one position to said memory in response to arrival of said clutch at said engaged position.

40. The vehicle of claim 34, wherein said determining means comprises means for establishing at least one position of initial engagement while one of said vehicle is coasting and said engine is under load, said transferring means including means for sending said one position to said memory in response to arrival of said clutch at said standby position.

41. The vehicle of claim 34, further comprising a cylinder for measuring the position of said clutch, a first body of fluid in said cylinder, a second body of fluid outside of said cylinder, and means for connecting said bodies with one another to permit pressure equalization of said bodies, said transferring means including means for sending at least one of said positions of initial engagement to said memory in response to pressure equalization of said bodies.

42. The vehicle of claim 1, wherein said clutch has a disengaged position in which said clutch is spaced from said transmission by a maximum distance and a standby position which is assumed by said clutch preparatory to engagement of said clutch with said transmission, said controlling means including means for shifting said clutch from said disengaged position to said standby position in accordance with a control function.

43. The vehicle of claim 1, wherein said clutch has a standby position which is assumed by said clutch preparatory to engagement of said clutch with said transmission, said controlling means including means for displacing said clutch, when said vehicle is to accelerate, from said standby position in said first direction in response to attainment of a reference speed which depends upon the position of said regulating means.

44. The vehicle of claim 1, wherein said clutch has a standby position which is assumed by said clutch preparatory to engagement of said clutch with said transmission, said controlling means including means for displacing said clutch, when said clutch is to be reengaged with said transmission during a gear change, from said standby position in said first direction in response to attainment of a reference slippage.

45. The vehicle of claim 44, further comprising means for adjusting said reference slippage with respect to a desired final slippage by means of a time function and on the basis of the actual slippage existing upon initial engagement of said clutch with said transmission.

46. The vehicle of claim 45, wherein said final slippage is zero.

47. The vehicle of claim 1, further comprising means for coupling said clutch to said engine so that the moment applied to said clutch equals or exceeds the moment of said engine.

48. The vehicle of claim 1, further comprising means for calculating the moment of said engine from the position of said regulating means and the speed of said engine.

49. The vehicle of claim 1, further comprising means for calcuating a reference moment for said clutch and for converting said reference moment into a reference displacement via a characteristic curve of said clutch.

50. The vehicle of claim 49, further comprising a hydraulic control valve for said clutch, means for comparing said reference displacement with an actual position of said clutch to generate a comparative value, and means for calculating, from said comparative value, a reference flow of hydralic fluid for operation of said valve.

51. A powered vehicle, comprising: an engine; a transmission; a clutch for coupling said engine to said transmission, said clutch having a predetermined position of initial engagement with said transmission; and means for automatically controlling said clutch, said controlling means including means for placing said clutch in a second position of disengagement from said transmission in response to starting of said engine while said vehicle is in neutral, and said controlling means also including means for displacing said clutch to a standby position between said predetermined and second positions when shifting of said vehicle from neutral into low gear is initiated.

52. A powered vehicle, comprising an engine; a manual transmission; a clutch for coupling said engine to said transission; and means for automatically controlling said clutch, said controlling means including means for moving said clutch from a disengaged position into engagement with said transmission, or from one position of engagement into another, without direct determination of the input speed of said transmission.

53. A powered vehicle, comprising an engine; a manual transmission; a clutch for coupling said engine to said transmission; and means for automatically controlling said clutch, said controlling means including means for moving said clutch to a predetermined position in which said clutch engages said transmission with a predetermined force such that said vehicle begins to creep, and said predetermned position at least approximating the position of initial engagement of said clutch with said transmission.

54. A powered vehicle, comprising an engine; a manual transmission; a clutch for coupling said engine to said transmission; and means for automatically controlling said clutch, said controlling means including means for releasing said clutch, and said releasing means comprising an element remote from said clutch which includes means for measuring the displacement of said clutch.

55. The vehicle of claim 54, wherein said release means further comprises an operating element which comprises a release bearing.

56. A powered vehicle, comprising an engine; a manual transmission; a clutch for coupling said engine to said transmission means for automatically controlling said clutch; and means for determining the position of initial engagement of said clutch with said transmission without direct determination of the input speed of said transmission.

57. A powered vehicle, comprising an engine; a manual transmission; a clutch for coupling said engine to said transmission; means for automatically controlling said clutch; a vehicle motion brake; and means for determining the position of initial engagement of said clutch with said transmission when said vehicle motion brake is activated and said vehicle is in gear and at least almost at a standstill.

58. A method of operating a vehicle having an engine, a manual transmission and a clutch for coupling said engine to said transmission, comprising the steps of idling said engine while said vehicle is in gear and at least almost at a stanstill; and automatically engaging said clutch with said transmission in such a manner that said vehicle begins to creep.

59. A powered vehicle, comprising: an engine; a transmission in a power flow from said engine; an automated clutch in said power flow, said clutch being engageable and disengageable to respectively transmit and interrupt the transmission of torque between said engine and said transmission; means for disengaging said clutch; and at least one means for controlling said clutch, including means for determining the position of initial engagement of said clutch with said transmission by more than one method.

60. A powered vehicle, comprising: an engine; a brake; means for regulating the speed of said engine, said regulating means having a plurality of positions including a rest position; a transmission in a power flow from said engine; an automated engageable and disengageable clutch in said power flow between said engine and said transmission; and at least one means for controlling said clutch, including means for moving said clutch to a first position under first conditions in which said vehicle is creeping, said means for operating is in said rest position and said transmission is in gear to transmit a first torque, and a waiting position under second conditions under which said clutch is in a disengaged waiting position in response to the application of said brake while said vehicle is creeping so that said transmission transmits a lesser second torque.

61. A powered vehicle comprising: an engine; means for regulating the speed of said engine by an operator of said vehicle, said regulating means having a plurality of positions including a rest position in which said engine is at idling speed and an operative position in which said engine is above idling speed; a transmission for transmitting torque to wheels of said vehicle; a clutch for coupling said engine to said transmission, said clutch being movable in a first direction to engage said transmission and in a second direction to disengage from said transmission, said clutch having a predetermined position in which said clutch engages said transmission at least with a relatively small force such that said vehicle begins to creeps and means for automatically controlling said clutch, said controlling means including means for invariably moving said clutch in said first direction to engage said transmission under predetermined conditions in which said vehicle is in gear and at least almost at a standstill, said engine is running and said regulating means is in said rest position.

62. A powered vehicle comprising an engine, said engine being operable at a plurality of speeds including an idling speed at which the vehicle is at rest and a plurality of speeds higher than said idling speed; a transmission for transmitting torque to wheels of said vehicles a clutch for selectively coupling said engine with and uncoupling said engine from said transmission, sad clutch being operable in a first direction to engage said engine with said transmission and in a second direction to disengage said engine from said transmission, said clutch having a predetermined condition in which said engine is engaged with said transmission at least with a relatively small force such that said vehicle begins to creep and means for automatically operating said clutch including means for invariably operating said clutch in said first direction at least to said predetermined condition under predetermined circumstances in which said vehicle is in gear and at least almost at a standstill and said engine is running.

63. A powered vehicle comprising an engine; means for regulating the speed of said engine by an operator of said vehicle, said regulating means having a plurality of positions including a rest position in which said engine is at idling speed and an operative position in which said engine is above idling speed; a transmission for transmitting torque to wheels of said vehicle; a clutch for coupling said engine to said transmission, said clutch being actuatable in a first direction to couple said transmission to said engine and in a second direction to uncouple said transmission from said engine, said clutch having a predetermined position in which said clutch couples said transmission to said engine with a relatively small force so that said vehicle begins to creep; and means for automatically controlling said clutch, said controlling means including means for invariably actuating said clutch in said first direction to couple said transmission to said engine so that the vehicle begins to creep and slippage between said engine and said transmission is steadily reduced and the speed at which the vehicle creeps increases constantly.

64. A powered vehicle comprising an engine; a transmission for transmitting torque to wheels of the vehicle; an automatically engageable and disengageable clutch in a power train between said engine and said transmission; and at least one means for controlling said clutch comprising a hydraulic system including a master cylinder, a slave cylinder for actuating said clutch, a hydraulic line between said cylinders, a source of hydraulic fluid connectable with said master cylinder by at least one sealable and unsealable equalizing passage arranged to effect a volume compensation between said source and said master cylinder, and regulating means for effecting a controlled at least temporary volume compensation.

65. The vehicle of claim 64 wherein said regulating means includes means for effecting repeated temporary volume compensation.

66. The vehicle of claim 64, wherein said regulating means includes means for effecting temporary volume compensation at predetermined intervals of time.

67. The vehicle of claim 64, wherein said regulating means includes means for effecting substantially cyclical volume compensation.

68. The vehicle of claim 64, wherein said regulating means includes means for effecting an unsealing of said at least one equalizing passage for at least one relatively short interval of time.

69. The vehicle of claim 68, wherein said at least one interval of time approximates or equals one second.

70. The vehicle of claim 64, wherein said regulating means includes means for effecting a sealing of said at least one passage in response to a detected intention to change the condition of said clutch.

71. The vehicle of claim 64, wherein said transmission has a neutral condition said regulating means includes means for sealing said at last one equalizing passage in response to changing of the condition of said transmission from neutral.

72. The vehicle of claim 64, wherein said transmission is shiftable between neutral engaged conditions and said regulating means includes means for effecting a sealing of said at least one equalizing passage in response to shifting of said transmission from said neutral condition, while the vehicle is at least substantially at a standstill, and in response to the application of a brake for said wheels.

73. A powered vehicle comprising an engine; a transmission for transmitting torque to wheels of the vehicle; an automatically engageable ad disengageable clutch in a power train between said engine and said transmission; and at least one means for controlling said clutch comprising a hydraulic system including a master cylinder, a slave cylinder for actuating said clutch, a hydraulic line between said cylinders, a source of hydraulic fluid connectable with said master cylinder by at least one sealable and unsealable equalizing passage arranged to effect a volume compensation between said source and said master cylinder, and regulating means for effecting at least temporary controlled engagement of said clutch and a volume compensation by way of said at least one equalizing passage.

74. The vehicle of claim 73, wherein said regulating means includes means for effecting repeated temporary volume compensation.

75. The vehicle of claim 73, wherein said regulating means includes means for effecting temporary volume compensation at predetermined intervals of time.

76. The vehicle of claim 73, wherein said regulating means includes means for effecting substantially cyclical volume compensation.

77. The vehicle of claim 73, wherein said regulating means includes means for effecting an unsealing of said at least one equalizing passage or at least one relatively short interval of time.

78. The vehicle of claim 77, wherein said at least one interval of time approximates of equals one second.

79. The vehicle of claim 73, wherein said regulating means includes means for effecting sealing of said at least one passage in response to a detected intention to change the condition of said clutch.

80. The vehicle of claim 73, wherein said transmission has a neutral condition and said regulating means includes means for sealing said at least one equalizing passage in response to changing of the condition of said transmission from neutral.

81. The vehicle of claim 73, wherein said transmission is shiftable between neutral and engaged conditions and said regulating means includes means for effecting a sealing of said at least one equalizing passage in response to shifting of said transmission from said neutral condition, while the vehicle is at least substantially at a standstill, and in response to the application of a brake to said wheels.

* * * * *